United States Patent Office 2,731,469
Patented Jan. 17, 1956

2,731,469

N-DIALKYLAMINOALKYL DERIVATIVES OF DIARYLISONICOTINAMIDES

Carl Peter Krimmel, Mundelein, Ill., assignor to G. D. Searle & Co., Chicago, Ill., a corporation of Illinois No Drawing. Application October 23, 1953,
Serial No. 388,057

6 Claims. (Cl. 260—295)

The present invention relates to a new group of heterocyclic amides and, more specifically, to N-dialkylaminoalkyl derivatives of diarylisonicotinamides. The compounds of my invention can be represented by the general structural formula

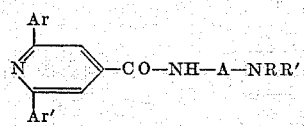

wherein Ar and Ar' are lower aryl radicals, A is a lower alkylene radical and the radical NRR' represents a lower dialkylamino radical or a saturated nitrogen-containing heterocyclic radical attached to the radical A through a nitrogen atom in the heterocycle.

For the purpose of my invention, the radicals Ar and Ar' are aryl hydrocarbon radicals, preferably containing 6 to 8 carbon atoms, such as phenyl, tolyl, and xylyl. The radical A represents a bivalent, saturated, aliphatic hydrocarbon radical of from 2 to 8 carbon atoms; this radical is derived from a straight-chain or branched-chain aliphatic hydrocarbon and includes radicals such as ethylene, propylene, butylene, amylene, or polymethylene radicals such as trimethylene, tetramethylene, pentamethylene, and hexamethylene. The radicals R and R' may represent such lower alkyl groups as methyl, ethyl, propyl, butyl, amyl, and hexyl, wherein the propyl, butyl, amyl and hexyl groups may be either of the straight-chain or branch-chain type. In addition the radical NRR' can also be a saturated nitrogen-containing heteromonocyclic group attached to the radical Alk through a nitrogen in the heterocycle; examples of suitable heterocyclic groups are N-pyrrolidino, N-piperidino, N-lupetidino, N-morpholino, N-thiamorpholino, N'-alkyl-N-piperazino and like radicals.

The organic bases of the foregoing type form salts with a variety of inorganic and strong organic acids including sulfuric, phosphoric, hydrochloric, hydrobromic, sulfamic, citric, ascorbic, and related acids. They also form quaternary ammonium salts with a variety of inorganic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide, and crotyl bromide.

The object of this invention is to provide novel organic amides and their salts. These amides are valuable pharmaceutical agents. They have a potent bactericidal effect. Further, they have a valuable cardiovascular effect and, more specifically, a regulatory effect on the heart.

My invention will appear more fully from the following examples which are set forth merely for the purpose of illustration and not to be construed as limiting the invention in spirit or in scope. In these examples temperatures are given uncorrected in degrees centigrade (° C.) and quantities of materials in parts by weight.

Example 1

A mixture of 70 parts of 2,6-diphenylisonicotinic acid and 328 parts of thionyl chloride is refluxed on the steam bath for 30 minutes. The excess thionyl chloride is removed under vacuum. The pale yellow crystalline acid chloride residue is used without further purification in the following reaction.

To 4200 parts of a warm anhydrous ethyl ether solution containing the above residue are added slowly 700 parts of an ethyl ether solution containing 41 parts of 1-diethylamino-5-aminopentane. The gum which is precipitated is extracted from the ether solution with 10% hydrochloric acid. The hydrochloric acid solution is separated and made alkaline with sodium hydroxide. The released oil is ether extracted, dried successively over anhydrous sodium sulfate and anhydrous potassium carbonate, filtered, and ether stripped to leave a residue of viscous amber oil. Crystallization of this oil is induced by removing all traces of solvent under vacuum, maintaining the solvent-free oil at 60–70° C. for 30 minutes, and periodic scratching. The crystalline material is dissolved in hot petroleum ether of a boiling range of 60–71° C., decolorized with activated charcoal, and recrystallized by concentration and cooling. The marked tendency to emulsify is overcome by seeding. In this manner the N-(ε-diethylaminopentyl)-2,6-diphenylisonicotinamide is obtained as white needles melting at about 78–80° C. The compound has the structural formula

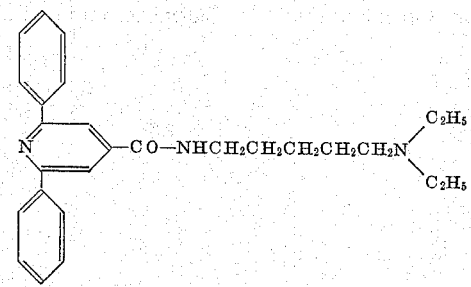

Example 2

A mixture of 100 parts of 2,6-diphenylisonicotinic acid and 490 parts of thionyl chloride is refluxed on the steam bath for 30 minutes. The excess thionyl chloride is removed under vacuum. The crystalline acid chloride residue is used without further purification in the following reaction.

To 5000 parts of a warm anhydrous ethyl ether solution containing the above residue are slowly added 700 parts of an ethyl ether solution containing 37 parts of 1-dimethylamino-3-aminopropane. The resultant white precipitate is taken up in 10% hydrochloric acid, separated, and made alkaline with sodium hydroxide. The released oil is readily crystallized by standing and scratching. The crystalline mass is broken up, washed with water, filtered and dried in a steam cabinet. This method is to be preferred over ether extraction of the oil and drying over anhydrous potassium carbonate, used in the case of Example 1, since there is a tendency for this base to crystallize readily from ether.

The crude crystalline product is recrystallized using petroleum ether of a boiling range of 86–100° C. and decolorizing carbon. The N-(γ-dimethylaminopropyl)-2,6-diphenylisonicotinamide is thus obtained as long white needles melting at about 151–153° C. The compound has the structural formula

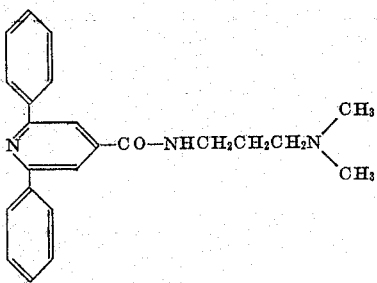

I claim:
1. A compound of the structural formula

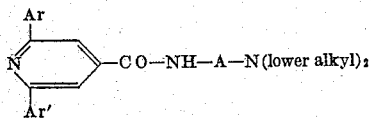

wherein Ar and Ar' are aryl hydrocarbon radicals with six membered rings containing 6 to 8 carbon atoms and A is a lower alkylene radical separating the two nitrogen atoms attached thereto by at least two carbon atoms.

2. A compound of the structural formula

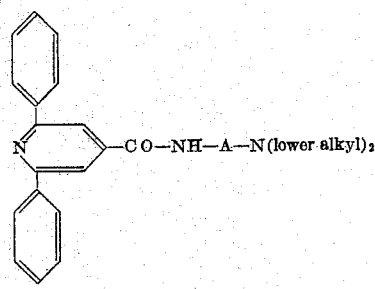

wherein A is a lower alkylene radical separating the two nitrogen atoms attached thereto by at least two carbon atoms.

3. A compound of the structural formula

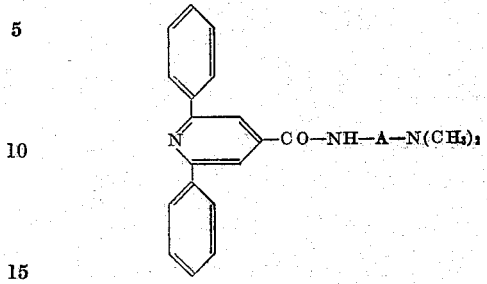

wherein A is a lower alkylene radical separating the two nitrogen atoms attached thereto by at least two carbon atoms.

4. N - ($\gamma$ - dimethylaminopropyl) - 2,6 - diphenylisonicotinamide.

5. A compound of the structural formula

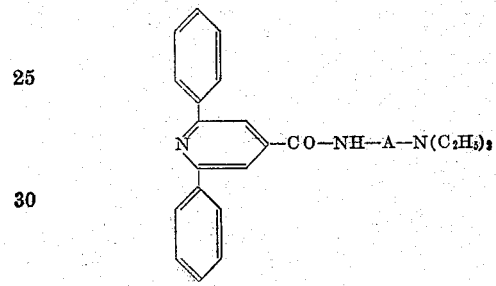

wherein A is a lower alkylene radical separating the two nitrogen atoms attached thereto by at least two carbon atoms.

6. N - ($\delta$ - diethylaminopentyl) - 2,6 - diphenylisonicotinamide.

No references cited.